United States Patent Office 3,198,811
Patented Aug. 3, 1965

3,198,811
1,2,3,4,5,6,7,7 - OCTACHLORO - 3,6 - METH-
ANO - 1,2,3,6 - TETRAHYDROPHTHALIC
ACID AND ANHYDRIDE
Edward D. Weil, Lewiston, N.Y., assignor to Hooker
Chemical Corporation, Niagara Falls, N.Y., a corpo-
ration of New York
No Drawing. Filed June 12, 1961, Ser. No. 116,253
4 Claims. (Cl. 260—346.3)

This invention describes a novel tricyclic perchlori-
nated composition of matter useful as an organic inter-
mediate and herbicide.

More particularly, this invention describes octachloro-
3,6-methano-1,2,3,6-tetrahydrophthalic anhydride, a useful
intermediate and herbicide and a novel process for prepar-
ing it. The novel composition has the structure:

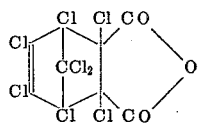

The above novel anhydride composition may be used
as an intermediate to form many diverse but related de-
rivatives of the structure:

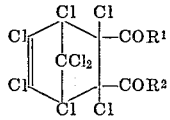

wherein $R^1$ and $R^2$ which may be the same or different,
are members selected from the group consisting of hy-
droxy, amino, alkoxy, aryloxy, alkylamino, dialkylamino
and $R^1$ and $R^2$ when conjoined to form a ring are mem-
bers of the group consisting of imino, alkylimino, hydroxy-
imino, alkylmercaptoimino, oxa (—O—) and thia
(—S—). These derivatives may be made by well known
and routine synthetic procedures involving one step or
multi-step reaction well known to the art, and common to
anhydrides generally. More detailed examples of some
of the compositions formed as well as the reactants used
appear in a more detailed form elsewhere in this applica-
tion.

The anhydride is prepared by the reaction represented
below:

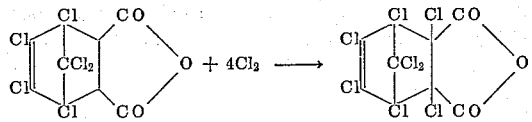

The starting material for preparing the composition of
this invention is 3,4,5,6,7,7-hexachloro-3,6-methano-1,2,3,
6-tetrahydrophthalic anhydride, a well known intermediate
for preparing polyester and other resins as well as for cur-
ing epoxide resins. Unfortunately, this hexachloro com-
pound has several shortcomings which has limited its use
in certain resin applications. For example, the resins con-
taining the cross-linked anhydride undergo photodecom-
position in sunlight causing the resin to darken or discolor,
thus making it unattractive for many outdoor uses or re-
quiring the incorporation of costly ultra-violet screening
agents in the resin. Since the photodecomposition has
been shown to involve hydrogen chloride evolution, the
replacement of the two α-hydrogen atoms with chlorine
atoms appeared to be a desirable solution to the problem.
However, the most logical preparation of the di-alpha
chlorinated anhydride, which formalistically would appear
to be the Diels-Alder addition of hexachlorocyclopentadi-
ene and dichloromaleic anhydride, would be expected on
the basis of the prior art (see for example, Ungnade and
McBee, Chemical Reviews, 58, 254 (1958)), to be un-
workable since hexachlorocyclopentadiene fails to under-
go the Diels-Alder addition with olefins having two chlo-
rines on each of the doubly bonded chlorines (i.e., the
—CCl=CCl— structure). The truth of this generaliza-
tion has been established experimentally by the failure of
the dichloromaleic anhydride to undergo the Diels-Alder
addition reaction with hexachlorocyclopentadiene under
even very vigorous conditions of time and temperature
(up to two hundred and ten degrees for several days).

Quite surprisingly, it has been found that the new com-
position of this invention can be prepared through the ex-
haustive chlorination of the aforementioned hexachlo-
rinated anhydride. This finding is unexpected and sur-
prising in view of the literature reports on products ob-
tained through the exhaustive chlorination of other re-
lated dibasic anhydrides. For example, the chlorination
of succinic anhydride (of which this product may be
considered a substituted derivative), does not yield the
α,α'-dichloro succinic anhydride corresponding to the ap-
plicant's product. Thus, since the most likely methods
of preparing the composition of this invention had been
shown by prior art generalizations and by laboratory ex-
periment to be inapplicable to make the new composition,
there was no obvious avenue to prepare the product and
in view of the analogous prior art, the applicant's process
of exhaustive chlorination of the anhydride was unex-
pected and unobvious.

The novel chlorination process of this invention is un-
usual and advantageous in that the reaction conditions are
not particularly critical. For example, the reaction may
be run without a catalyst although actinic light provided
through a conveniently sized mercury vapor or fluores-
cent light does speed the reaction and improve yield.
Other appropriate catalysts include but are not limited to
activated carbon, phosphorus pentachloride or halides of
the transition elements. No particular control of the
chlorine feed is necessary as long as at least a stoichiomet-
ric amount of chlorine is used. No solvent is required,
although a solvent inert to the reactants may be expediti-
ously used. Chlorine-resistant solvents such as chlo-
rinated hydrocarbons may be used for example. The re-
action may be run at pressures ranging from subatmos-
pheric through atmospheric and superatmospheric pres-
sures. The rate of reaction increases with chlorine pres-
sure. The reaction temperature for the chlorination is
not critical ranging from about the boiling point of liquid
chlorine up to two hundred degrees centigrade, the latter
temperature being the highest operable temperature since
it represents the decomposition temperature of the prod-
uct.

The inventive process is preferably performed as fol-
lows. The starting material is completely or partly dis-
solved in an inert solvent such as carbon tetrachloride and
exposed to a direct source of actinic light. The mixture
of anhydride and solvent is stirred and chlorine gas is
passed into the solution. After the theoretical weight in-
crease has occurred or the theoretical amount of hy-
drogen chloride has been evolved the chlorination is
stopped and the solvent partially removed by evapora-
tion. The octachlorinated product crystallizes from solu-
tion as a while crystalline solid melting with decomposi-
tion at two hundred to two hundred and ten degrees. A
precise melting point is somewhat dependent on the rate
of heating. The correct structure for the product is
provided by analysis for total chlorine, infra-red analysis
which shows no C—H bonds and no double bonds other
the —CCl=CCl—, and by thermal decomposition to the
known dichloromaleic anhydride plus hexachloro-cyclo-
pentadiene by the reverse Diels-Alder addition reaction.

In its composition aspect, this invention offers several important and unexpected advantages. For example, the octachloro - 3,6-endomethylene-1,2,3,6-tetrahydrophthalic anhydride of this invention has been found to have pesticidal activity not possessed by the hexachloro starting material, and is a valuable intermediate for preparing various molecules, also having pesticidal and herbicidal activity. The following are illustrative of some of the intermediates which may be prepared using the novel anhydride of this invention:

of a two hundred and fifty-watt mercury vapor lamp located in a pyrex glass well extending into the reaction vessel. Over the course of twelve hours, two molar equivalents of hydrogen chloride were evolved. The clear, yellow solution was freed of chlorine by purging with nitrogen, then partially evaporated, diluted with heptane, and cooled, depositing thereby three hundred and sixty-six grams of crystalline product.

The product, crystallized from heptane, melted at two

| Reactant | Product |
|---|---|
| Water (preferably admixed with a co-solvent such as acetone, at 0° up to the boiling point). | [structure with COOH groups] (colorless solid, M.P. 231°, insoluble in water, soluble in dilute caustic soda) |
| ROH (where R=methyl, other alkyl, aryl, heterocyclic radical). | [structure with COOH and COOR] and [structure with two COOR] |
| R¹R²NH (where R¹, R²=hydrogen, alkyl, aryl, or heterocyclic radical). | [structure with CONR¹R² and COOH] and [structure with CO-NR² ring] (when R¹=H) |
| HO—A—OH (where A is a divalent organic radical) polyester. | [structure with COO—A groups]ₓ |

Another advantage of the inventive composition is that is is an economical selective herbicide effective against a variety of weeds including, but not limited to crabgrass, seedling Johnson grass and foxtail.

That this composition is biologically active, much less herbicidally active, is most unexpected considering the biological inertness of its precursor, the 3,4,5,6,7,7-hexachloro-3,6-methano - 1,2,3,6-tetrahydrophthalic anhydride or acid.

The rate of application cannot be precisely stated due to varying degree of resistance possessed by the weed species and crop, the stage of weed and crop growth, the soil type and climatic conditions, but in general, the rates will be at least one-quarter of a pound of herbicide per acre and for reasons of cost will seldom exceed one hundred pounds per acre, with the preferred range falling within one-half to fifty pounds per acre. Where the weeds are in an early stage of growth, they being more susceptible, will frequently respond to the rates from one-half to four pounds per acre while older weeds or weeds that are to be totally eradicated from ornamental beds or turf may require rates in excess of four pounds per acre. In those instances where the weed population has been allowed to accumulate unchecked or where mature plants are encountered, applications of up to fifty and even beyond this rate may be required.

The following examples are intended to illustrate the workings of this invention including such facets as the preparation of the herbicidal compositions, their formulation as herbicidal agents, and the testing results obtained using the formulation.

EXAMPLE 1

Into a refluxing suspension of three hundred and seventy-one grams of 3,4,5,6,7,7-hexachloro-3,6-methano-1,2,3,6-tetrahydrophthalic anhydride in five hundred milliliters of carbon tetrachloride was introduced in a stream of chlorine gas, while illuminating the mixture by means of a two hundred and fifty-watt mercury vapor lamp located in a pyrex glass well extending into the reaction vessel. Over the course of twelve hours, two molar equivalents of hydrogen chloride were evolved. The clear, yellow solution was freed of chlorine by purging with nitrogen, then partially evaporated, diluted with heptane, and cooled, depositing thereby three hundred and sixty-six grams of crystalline product.

The product, crystallized from heptane, melted at two hundred to two hundred and ten degrees. The total chlorine content was found to be 64.1 percent, theoretical for $C_9Cl_8O_3$ being 64.5 percent. The neutralization equivalent in methanolic solution was four hundred and forty (milligrams per milliequivalent), (theory four hundred and forty, assuming formation of the monomethyl ester of $C_9Cl_8O_4H_2$) and in aqueous acetone was two hundred and twenty (theory two hundred and twenty, assuming formation of the dibasic acid $C_9Cl_8O_4H_2$).

The product, when heated for one-half hour at two hundred and five to two hundred and ten degrees, was converted to a melt which by infrared analysis was shown to contain thirty-two plus or minus three percent hexachlorocyclopentadiene, fifteen plus or minus five percent dichloromaleic anhydride, and the remainder undecomposed starting material.

EXAMPLE 2

This example illustrates the use of octachloro-3,6-methano-1,2,3,6-tetrahydrophthalic anhydride as a chemical intermediate for the preparation of a product having utility as a herbicide. A solution of 8.8 grams of the anhydride and 2.92 grams of diethylamine in fifty milliliters of ethyl ether was allowed to stand forty-eight hours and filtered, yielding 10.3 grams of diethylammonium N,N-diethyl - 1,2,3,4,5,6,7,7 - octachloro-3,6 - methano-1,2,3,6-tetrahydrophthalamate; 4.6 percent N found, 5.0 percent N theoretical; 49.5 percent Cl found, 50.6 percent theoretical.

EXAMPLE 3

*Octachloro-3,6-methano-1,2,3,6-tetrahydrophthalimide*

Into 17.6 grams of octachloro-3,6-methano-1,2,3,6-tetrahydrophthalic anhydride dissolved in two hundred cc. of chlorobenzene was passed a stream of dry ammonia gas for twenty-five minutes. The ammonium salt of the amic acid precipitated. The mixture was then boiled for one hour under reflux, filtered with activated charcoal, and the filtrate evaporated to dryness with reduced pressure. The residue was recrystallized from aqueous acetone to obtain a colorless solid, melting point two hundred and fifty to two hundred and fifty-two degrees (with decomposition).

*Analysis.*—Calcd. for $C_9H_3Cl_6O_2N$: N, 3.8 percent. Found: N, 3.6 percent.

EXAMPLE 4

*N,N-diethyloctachloro-3,6-methano-1,2,3,6-tetrahydrophthalamic acid*

To 8.8 grams of octachloro-3,6-methano-1,2,3,6-tetrahydrophthalic anhydride in fifty cc. dry ether was added 1.46 gram of diethylamine. After two days, the solid precipitate was filtered out, washed with ether and dried to obtain a white powder having the correct analysis for the diethylamine salt of the desired acid.

*Analysis.*—Calcd. for $C_{15}Cl_8O_3H_{21}N_2$: Cl, 50.6 percent; N, 5.0 percent. Found: Cl, 49.5 percent; N, 4.8 percent.

EXAMPLE 5

In a similar manner was prepared the N,N-diisopropyloctachloro-3,6-methano-1,2,3,6-tetrahydrophthalamic acid (a white solid) and its diisopropylamine salt (a white solid), the N,N-di(2-ethylhexyl)octachloro-3,6-methano-1,2,3,6-tetrahydrophthalamic acid (a colorless syrup), and its di(2-ethylhexyl)amine salt (a brownish syrup).

EXAMPLE 6

The anhydride of Example 1 was applied at the rate of eight pounds per acre to an area seeded with snap beans, cotton, and foxtail (Setaria spp.). After ten days, when the dicotyledenous species had successfully germinated without apparent chemical injury, only a few severely stunted foxtail were found. A control area not treated with the chemical contained a heavy stand of foxtail.

Similar results were obtained using the acid, the imide or the monomethyl ester of the parent acid of my invention in place of the anhydride.

EXAMPLE 7

An area seeded with crabgrass, Johnson grass, and quackgrass as representative grassy weeds, and soybeans as a representative crop of a commonly herbicide-sensitive type, was sprayed with an aqueous acetone solution of the acid of the invention at sixteen pounds per acre. The weedy grasses were almost completely prevented from sprouting while the soybeans sprouted normally.

I claim:

1. A compound selected from the group consisting of 1,2,3,4,5,6,7,7 - octachloro - 3,6-methano-1,2,3,6-tetrahydrophthalic acid and 1,2,3,4,5,6,7,7-octachloro-3,6-methano-1,2,3,6-tetrahydrophthalic anhydride.

2. A process for making 1,2,3,4,5,6,7,7-octachloro-3,6-methano-1,2,3,6-tetrahydrophthalic anhydride which comprises reacting chlorine with 3,4,5,6,7,7-hexachloro-3,6-methano-1,2,3,6-tetrahydrophthalic anhydride.

3. 1,2,3,4,5,6,7,7 - octachloro - 3,6 - methano - 1,2,3,6-tetrahydrophthalic acid.

4. 1,2,3,4,5,6,7,7 - octachloro - 3,6 - methano - 1,2,3,6-tetrahydrophthalic anhydride.

References Cited by the Examiner
UNITED STATES PATENTS

| | | | |
|---|---|---|---|
| 2,326,471 | 8/43 | Lantz | 260—558 |
| 2,795,589 | 6/57 | Bluestone | 260—326 |

NICHOLAS S. RIZZO, *Primary Examiner.*

IRVING MARCUS, *Examiner.*